US011849664B2

(12) United States Patent
Rosenberg

(10) Patent No.: US 11,849,664 B2
(45) Date of Patent: Dec. 26, 2023

(54) HOPPER EXTENSION

(71) Applicant: Rosenberg Industries LLC, Trimont, MN (US)

(72) Inventor: Jason Rosenberg, Trimont, MN (US)

(73) Assignee: Rosenberg Industries LLC, Trimont, MN (US)

( * ) Notice: Subject to any disclaimer, the term of this patent is extended or adjusted under 35 U.S.C. 154(b) by 543 days.

(21) Appl. No.: 17/130,159

(22) Filed: Dec. 22, 2020

(65) Prior Publication Data

US 2022/0192082 A1 Jun. 23, 2022

(51) Int. Cl.
*A01C 15/00* (2006.01)

(52) U.S. Cl.
CPC .................... *A01C 15/006* (2013.01)

(58) Field of Classification Search
CPC .... B65D 21/00; B65D 21/02; B65D 21/0209; B65D 2231/007; B65D 2231/008; A01C 15/006

See application file for complete search history.

(56) References Cited

U.S. PATENT DOCUMENTS

| 2,738,904 | A | | 3/1956 | Poynor |
| 3,407,971 | A | * | 10/1968 | Oehler .................. B65D 88/28 222/386.5 |
| 3,762,603 | A | | 10/1973 | Bauman et al. |
| 4,398,653 | A | * | 8/1983 | Daloisio .............. B65D 90/205 222/143 |
| 4,960,300 | A | | 10/1990 | Burvee |
| D335,293 | S | | 5/1993 | Pingry et al. |
| 7,918,720 | B2 | | 4/2011 | Mohr et al. |
| 8,505,780 | B2 | * | 8/2013 | Oren ...................... B65D 25/08 220/601 |
| 8,585,341 | B1 | * | 11/2013 | Oren .................... B65D 90/587 414/407 |
| 8,887,914 | B2 | * | 11/2014 | Allegretti ............... B65D 19/06 108/51.11 |

(Continued)

FOREIGN PATENT DOCUMENTS

| DE | 102007003653 A1 | 7/2008 | |
| FR | 2638711 A1 * | 5/1990 | ............ B65D 88/30 |
| GB | 2569834 A | 7/2019 | |

OTHER PUBLICATIONS

"John Deere Planter Accessories," retrieved from the Internet: <URL: http://www.distelgrain.com/products.cfm?action=product &catid=13F48431-ACE7-7C54-9C3A-454F4A21F4DA&id= 28CDB115-1C23-D4F9-7442-887C9C31F85A>, 2 pages. Retrieved on Apr. 28, 2020.

(Continued)

*Primary Examiner* — Donnell A Long
(74) *Attorney, Agent, or Firm* — Merchant & Gould P.C.

(57) ABSTRACT

A hopper extension includes forward and rearward walls connected by first and second side walls to form a container area having an upper opening and a lower opening. The lower opening includes a mating interface that slidably interfaces with an existing hopper. The hopper extension further includes a ramped wall extending from each of the forward, rearward, first side and second side walls to form a seed opening positioned intermediate the upper and lower openings. An underside of at least one of the ramped walls defining an air cavity that is placed over an air grate of an existing hopper when the hopper extension is secured thereto.

20 Claims, 16 Drawing Sheets

(56) References Cited

U.S. PATENT DOCUMENTS

2008/0110892 A1* 5/2008 House .................. A01C 15/006
220/324
2009/0120528 A1* 5/2009 Fisher ................ B65D 81/3211
141/330

OTHER PUBLICATIONS

Lundell Plastics Corp., "EXTRACRE High-Capacity Seed Box Extensions," retrieved from the Internet: <URL: https://www.lundellplastics.com/planting-products/extracre.asp>, 4 pages. Retrieved on Apr. 28, 2020.
"MaxEmerge2 Planter 1 Bushel Fiberglass Seed Box Extension," retrieved from the Internet: <URL: https://www.sloanex.com/a78n5lfw0d-distelgrain1busheljohndeerefiberglassseedboxextension.html#view-2>. Retrieved on Apr. 28, 2020, 3 pages.
"Pro-Series™ hopper extension," retrieved from the Internet: <URL: http://salesmanual.deere.com/sales/salesmanual/en_NA/seeding/attachments/handling/planters/pro_series_hopper_extensions.html>, 1 page. Last updated Sep. 25, 2018.
"Seed Box Extension," retrieved from the Internet: <URL: https://www.shoupparts.com/SH2690-Seed-Box-Extension>, 4 pages. Retrieved on Apr. 28, 2020.
"Seed Box Extension," retrieved from the Internet: <URL: https://www.shoupparts.com/SH4690-Seed-Box-Extension>. Retrieved on Apr. 28, 2020, 3 pages.

* cited by examiner

HOPPER EXTENSION

TECHNICAL FIELD

The present disclosure is directed to seed hoppers and, more particularly, to a hopper extension securable to the seed hopper and providing additional seed fill volume.

BACKGROUND

Modern planting equipment (i.e., automated seed planters) utilize a vacuum arrangement to draw seed into a hopper, which in turn is used to funnel seed to a planting apparatus. In such systems, a modern trend is reduction in the size of the hopper that is used. This is seen, for example in the John Deere ExactEmerge planter, which is a multi-row planter utilizing a blower/vacuum central seed system that delivers seed to each row planter via a hopper. The hopper of the John Deere ExactEmerge planter is small volume hopper having a volume of approximately 30 cubic inches.

The central seed system and the mini-sized hoppers of such modern planters are suitable for large-scale planting operations. However, it is often desirable to use the same planter for small plots, such as test plots of particular seed crops. In the context of a small planting, it is inefficient to fill a central seed tank to supply each small volume hopper. Rather it is preferred to manually fill each small volume hopper with a quantity of seed suitable to the area to be planted. Unfortunately, the mini-sized hopper of the ExactEmerge planter is often unable to hold a sufficient amount of seed to plant a small plot and requires frequent refills. In one instance, it has been observed that the ExactEmerge planter, relying only on the seed content of its manually filled mini-hoppers, may only be able to proceed 800 feet before a manual refill is required. In other words, multiple refills of the mini-hopper may be required to complete an individual plot or test planting, which is undesirable.

SUMMARY

A hopper extension interfaces with an existing seed hopper to provide additional seed holding capacity. Stacking of multiple interfacing hopper extensions provides even further seed holding capacity. Ramped surfaces within the hopper extension direct seed into the existing seed hopper and provide structural support to the outer walls of the hopper extension. An underside of the same ramped surfaces provides an air channel to direct blower air passing through the existing seed hopper to an environmental outlet.

An aspect of the present disclosure is directed to a hopper extension that includes forward and rearward walls connected by first and second side walls to form a container area having an upper opening and a lower opening. The lower opening includes a mating interface that slidably interfaces with an existing hopper. The hopper extension additionally includes a ramped wall extending from each of the forward, rearward, first side and second side walls to form a seed opening positioned intermediate the upper and lower openings. An underside of at least one of the ramped walls defines an air cavity.

In certain embodiments, the upper and lower openings are defined by a perimeter that corresponds to a perimeter of an upper opening of the existing hopper. In certain embodiments, the perimeter is of a trapezoidal configuration. In certain embodiments, The perimeter of the upper opening is different from the from perimeter of the lower opening, e.g. the perimeter of the upper opening is of a square or rectangular configuration while the perimeter of the lower opening is of a trapezoidal configuration that corresponds to the existing hopper. In certain embodiments, the mating interface includes a pair of rails that interface with a flange surrounding an upper opening of the existing hopper; the mating interface can also include a mounting tab that interfaces with a forward edge of the flange of the existing hopper.

In certain embodiments, the air cavity of the hopper extension is positioned over an air grate of an existing hopper when secured thereto. In certain embodiments, the underside of at least two of the ramped walls define first and second air cavities with the first air cavity being positioned over an air grate of the existing hopper and the second cavity being positioned over an air channel of the existing hopper. In certain embodiments at least one of the ramped walls includes a funneling feature to direct seed toward the seed opening of the hopper extension, which is aligned with the seed opening of the existing hopper.

Another aspect of the present disclosure is directed to a hopper extension that is in the form of a unitary additive-manufactured unit. The unit includes a container defined by an upper and lower opening with the lower opening including a mating interface that slidably interfaces with an existing hopper. The unit further includes a plurality of ramped walls that are interior to the container and angle downward toward the lower opening. The plurality of ramped walls meet to define a seed opening intermediate the upper and lower opening with an air cavity existing between an underside of the ramped walls and the lower opening.

Another aspect of the present disclosure is directed to a hopper extension system. The system includes first and second hopper extensions. Each of the first and second hopper extensions includes a container defined by an upper opening and a lower opening with the lower opening including a mating interface. Each of the first and second hopper extensions includes a plurality of ramped walls interior to the container that ramp downward toward the lower opening. The plurality of ramped walls meet to define a seed opening intermediate the upper and lower openings with an air cavity existing between an underside of the ramped walls and the lower opening. The mating interface of each of the first and second hopper extensions slidably interfaces with a flange surrounding the upper opening of the other of the first and second hopper extensions or with a flange surrounding an upper opening of an existing hopper.

The above summary is not intended to describe each embodiment or every implementation. A more complete understanding will become apparent and appreciated by referring to the following detailed description and claims in conjunction with the accompanying drawings.

BRIEF DESCRIPTION OF THE DRAWINGS

The figures are not necessarily to scale. Like numbers used in the figures refer to like components. However, it will be understood that the use of a number to refer to a component in a given figure is not intended to limit the component in another figure labeled with the same number.

DETAILED DESCRIPTION

Figure 1:
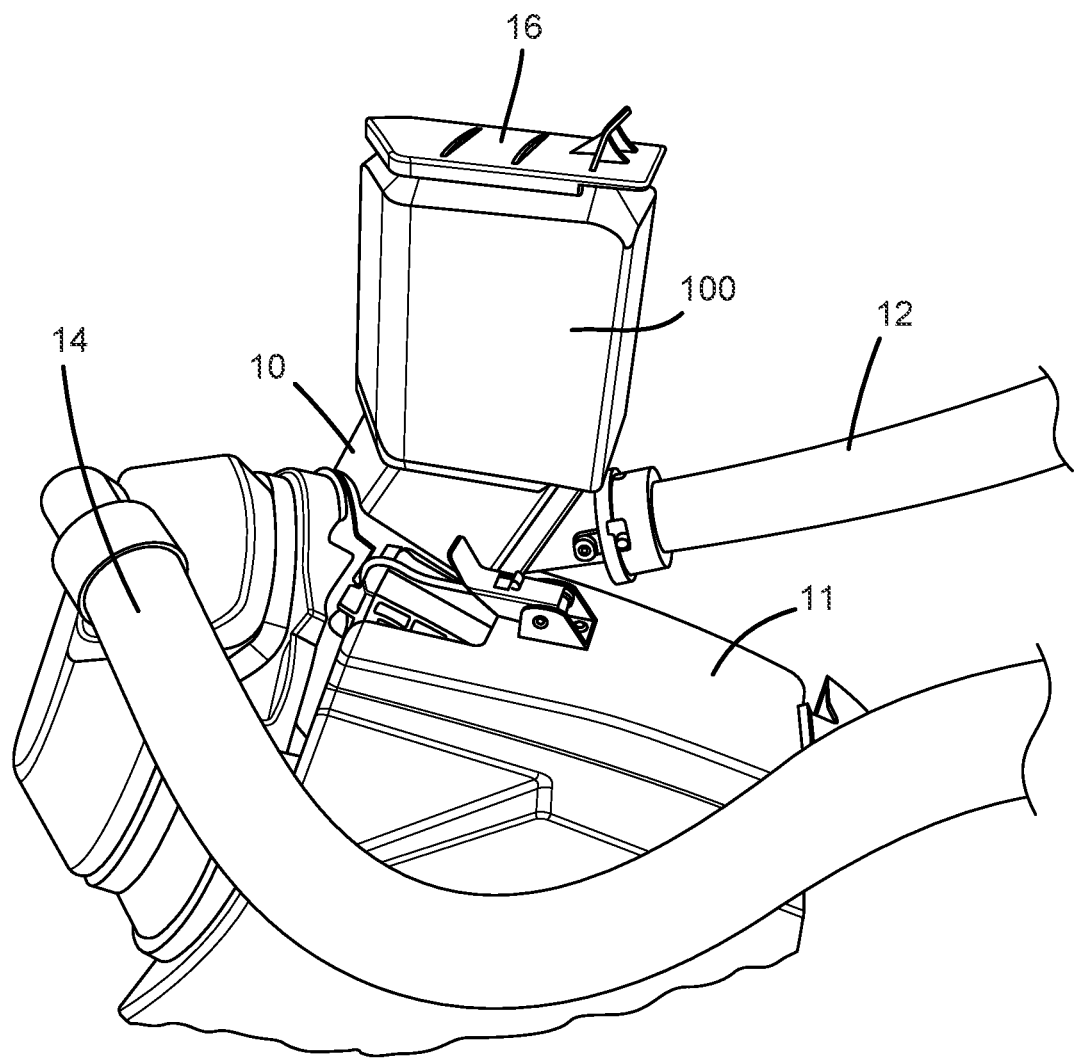
FIG. 1 is a perspective of a hopper extension, according to the present disclosure, mounted atop an existing hopper of a planter.

Various embodiments will be described in detail with reference to the drawings, wherein like reference numerals represent like parts and assemblies through the several views. Reference to various embodiments does not limit the scope of the claims attached hereto. Additionally, any examples set forth in this specification are not intended to be limiting and merely set forth the many possible embodiments for the appended claims.

Whenever appropriate, terms used in the singular also will include the plural and vice versa. The use of "a" herein means "one or more" unless stated otherwise or where the use of "one or more" is clearly inappropriate. The use of "or" means "and/or" unless stated otherwise. The use of "comprise," "comprises," "comprising," "include," "includes," and "including" are interchangeable and not intended to be limiting. The term "such as" also is not intended to be limiting. For example, the term "including" shall mean "including, but not limited to."

A hopper extension, according to the present disclosure, is designed to interface with a seed hopper (e.g., a small volume seed hopper), such as the mini-hopper of the John Deere ExactEmerge planter, to provide additional seed holding capacity suitable for small plot planting applications. In certain embodiments, the hopper extension provides an additional volume of approximately 105 cubic inches. In certain embodiments, two or more hopper extensions are stackable to provide even further seed holding capacity. The hopper extension has a lower mating interface that includes a set of rails that allow the hopper extension to slidably attach to the existing hopper by sliding over a flange of the hopper. Once secured to the hopper, a seed opening of the hopper extension aligns with a seed opening of the existing hopper, and ramped surfaces of the hopper extension direct seed to the openings. An underside of the ramped surfaces provides an air channel enabling air delivered with the seed to be drawn through an air screen of the small volume hopper by an attached vacuum. In certain embodiments, the hopper extension is manufactured through use of additive manufacturing (e.g., three-dimensional printing) as a unitary item.

FIG. 1 illustrates a hopper extension 100 of the present disclosure removably secured to an existing small volume seed hopper 10. In the illustrated configuration, the existing seed hopper 10 is a mini-hopper of a John Deere ExactEmerge planter 11. The hopper 10 is an element of a pressurized central seed system that additionally includes a central seed tank (not shown). The seeds from the seed tank are delivered through a pressurized seed hose 12 to the hopper 10. The seeds are then drawn from the hopper 10 into a seed tube (not shown) for planting, via a vacuum created with vacuum hose 14. A lid 16 covers the hopper extension 100.

Figure 2:
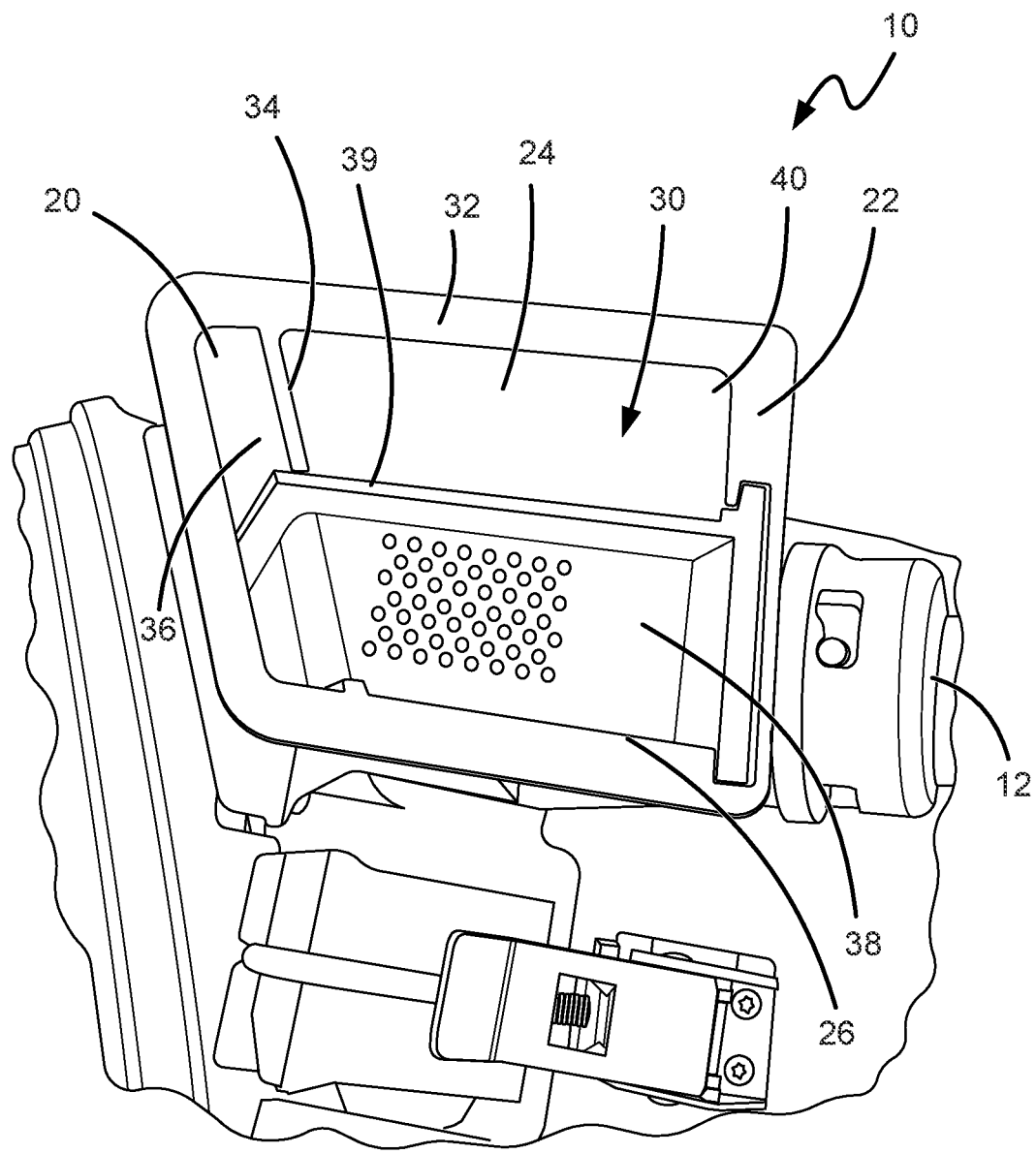
FIG. 2 is a top perspective view of the existing hopper of FIG. 1.
Figure 3:
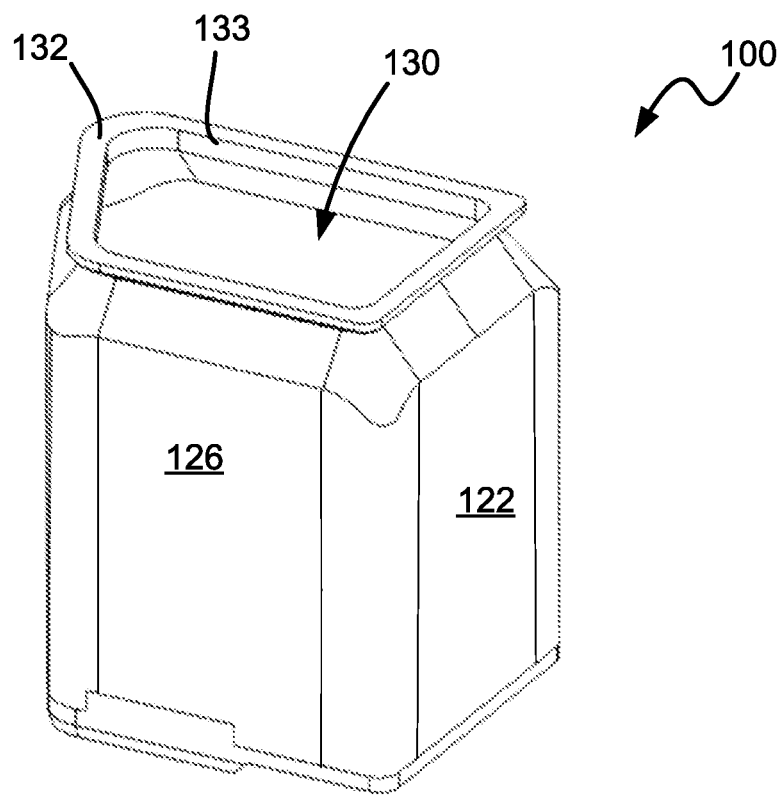
FIG. 3 is a side perspective view of the hopper extension of FIG. 1 illustrating a top opening of the hopper extension.
Figure 4:
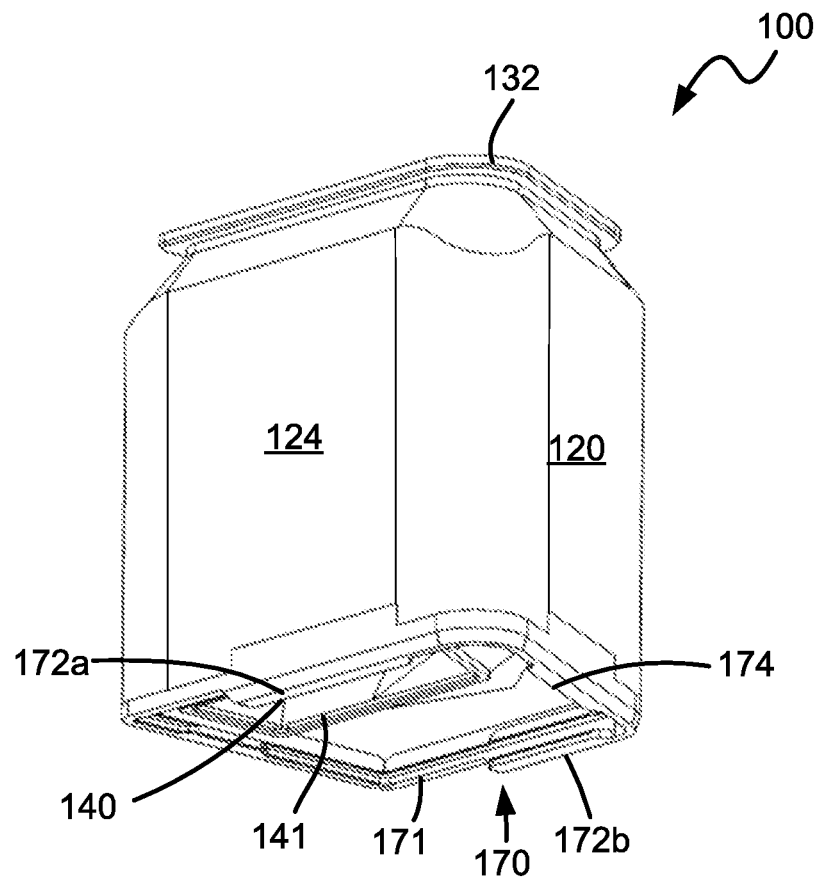
FIG. 4 is a side perspective view of the hopper extension of FIG. 1 illustrating a lower opening of the hopper extension.
Figure 5:
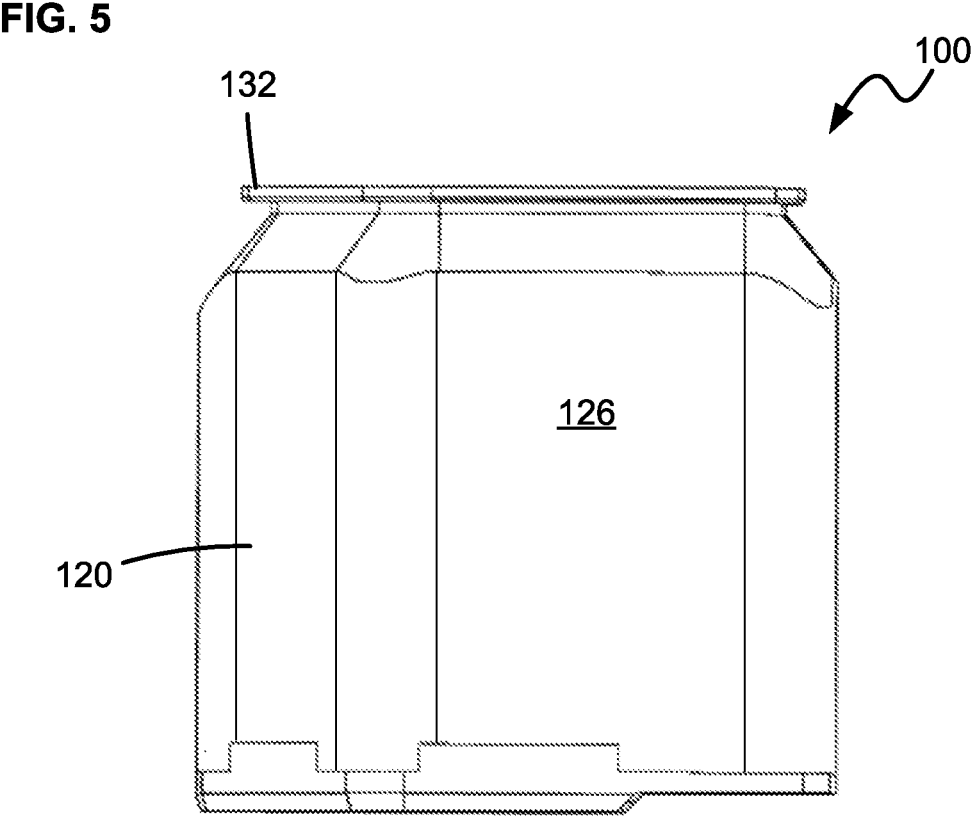
FIG. 5 is a first side elevation view of the hopper extension of FIG. 1.
Figure 6:
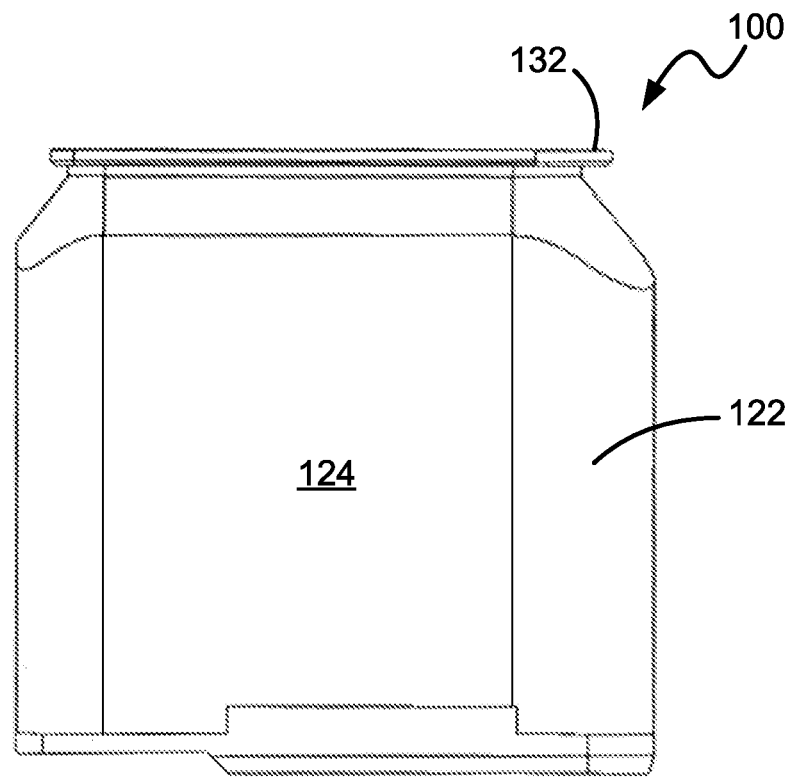
FIG. 6 is a second side elevation view of the hopper extension of FIG. 1.
Figure 7:
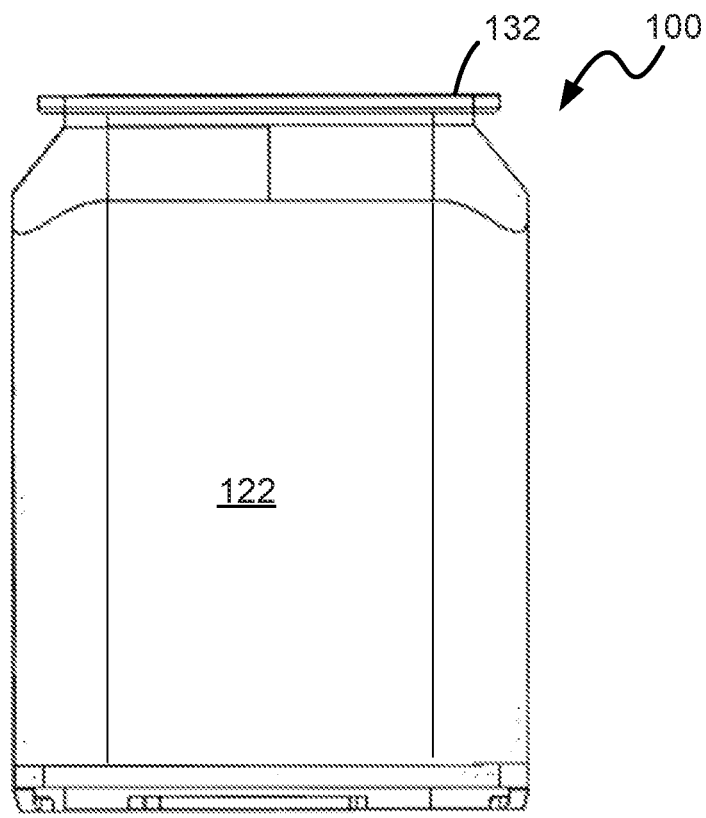
FIG. 7 is a third side elevation view of the hopper extension of FIG. 1.
Figure 8:
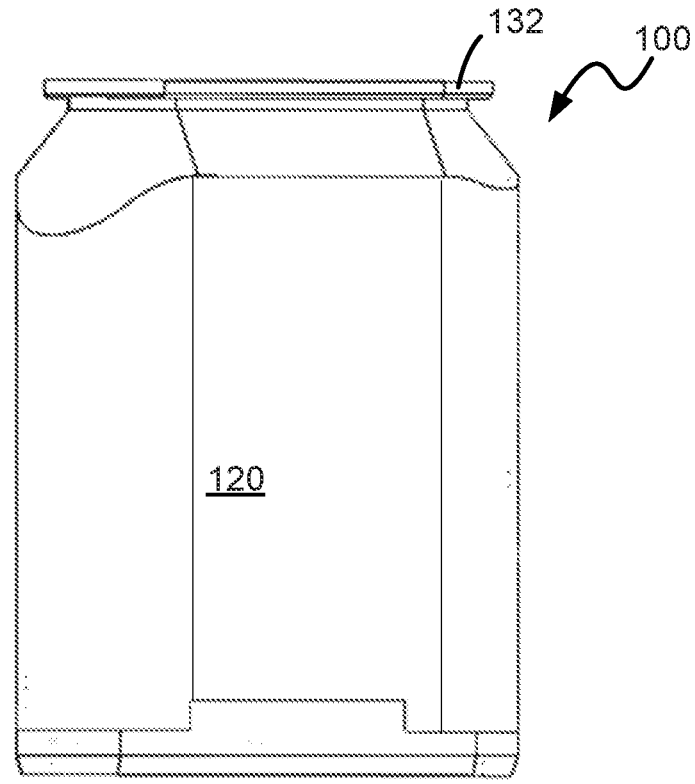
FIG. 8 is a fourth side elevation view of the hopper extension of FIG. 1.
Figure 9:
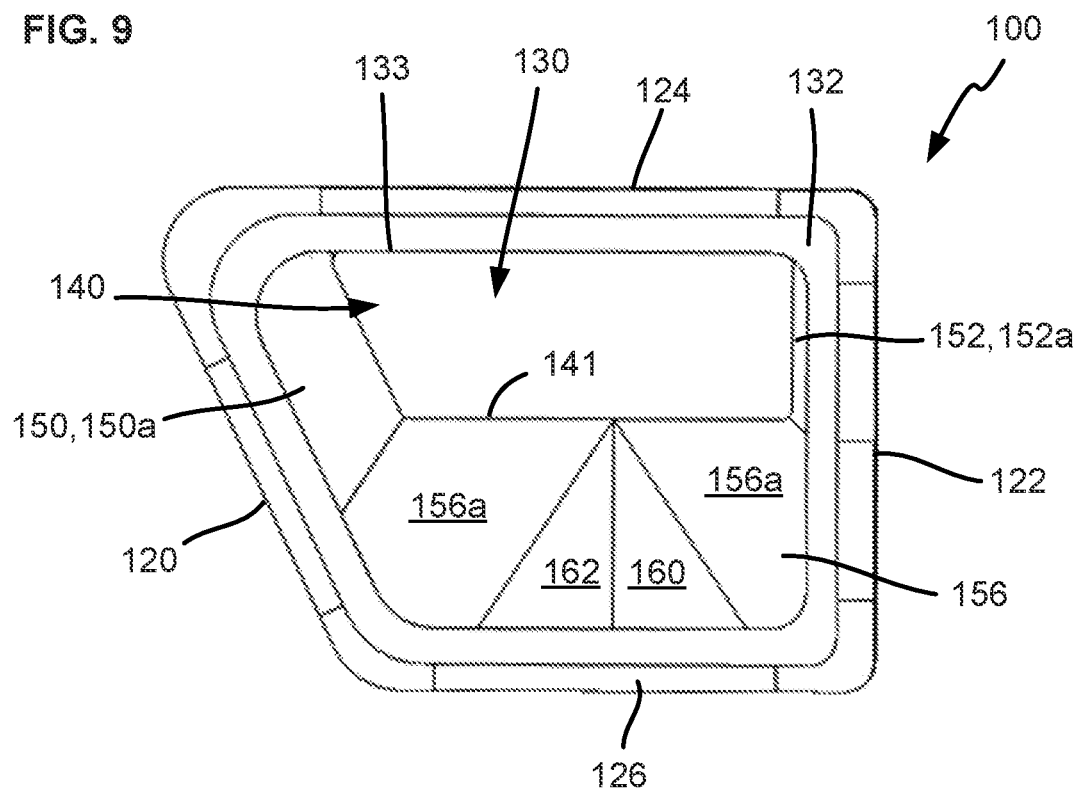
FIG. 9 is a top elevation view of the hopper extension of FIG. 1.

Further details of the existing hopper 10 can be appreciated with respect to FIG. 2. As shown, the existing hopper 10 is generally of a quadrilateral trapezoid configuration having a forward wall 20 and a rearward wall 22 joined by a first side wall 24 and a second side wall 26. The walls 20-26 define an upper opening to a container area 30 with a flange 32 surrounding a perimeter of the upper opening. An interior wall 34 of the container area 30 defines an air channel 36. An air grate 38 slidably interfaces with the interior wall 34 and the rearward wall 22. An interior edge 39 of the air grate 38 along with the interior wall 34, rearward wall 22 and first side wall 24 define a perimeter of a seed opening 40 to the container area 30. The vacuum hose 14 (see FIG. 1) draws air from the air channel 36 through the air grate 38 resulting in seed within the container area 30 being drawn into the seed tube (not shown). The existing hopper 10 has a volume of approximately 30 cubic inches.

Further details of the hopper extension 100 according to the present disclosure can be appreciated with respect to FIGS. 3-12. As shown, the hopper extension 100 is generally of a trapezoidal quadrilateral configuration that corresponds to the configuration of the existing hopper 10. The trapezoidal quadrilateral configuration includes a forward wall 120 and a rearward wall 122 joined by a first side wall 124 and a second side wall 126. The walls 120-126 define an upper opening to a container area 130. A flange 132 surrounds a perimeter 133 of the upper opening. In certain embodiments, the flange 132 can receive a lid, e.g., lid 16 originally provided for the existing hopper 10 (or a newly configured lid) or receive a second hopper extension 100.

FIGS. 9-12 illustrate the unique configuration of the container area 130 and hopper mating interface 170. The container area 130 is equipped with a plurality of ramped walls that extend from each the walls 120-126 to define a seed opening 140 having a perimeter 141 that corresponds to the perimeter of the seed opening 40 in the existing hopper 10 (see FIG. 2). The ramped walls include a first ramped wall 150, having an upper surface 150a and a lower surface 150b, that extends from the forward wall 120 to the seed opening 140. Relative to the flange 132, the first ramped wall 150 begins at approximately three-quarters down length of the forward wall 120 from the flange 132. The first ramped wall 150 can be formed at a variety of angles; in the example shown, the first ramped wall will have an angle of approximately 45 degrees from vertical (e.g., forming a 135 degree angle with an interior sidewall located above that ramped wall. The ramped walls include a second ramped wall 152, having an upper surface 152a and a lower surface 152b, that extends from the rearward wall 122 to the seed opening 140. Relative to the flange 132, the second ramped wall 152 also begins at approximately three-quarters down the length of the rearward wall 122 from the flange 132. As with the first ramped wall 150, the second ramped wall 152 may be formed at a variety of angles; in the example shown, a 45 degree angle relative to vertical is used. The ramped walls include a third ramped wall 154, having an upper surface 154a and a lower surface 154b, that extends from the first side wall 124 to the seed opening 140. Relative to the flange 132, the third ramped wall 154 also begins at approximately three-quarters of the way down the length of the first side wall 124 from the flange 132. A similar angle may be used for the third ramped wall 154 (e.g., 45 degrees).

The ramped walls include a fourth ramped wall 156, having an upper surface 156a and a lower surface 156b, that extends from the second side wall 126. Relative to the flange 132, the fourth ramped wall 156 begins at approximately half-way down the length of the second side wall 126 from the flange 132. The fourth ramped wall 156 includes a funneling feature 158 to funnel seed to the seed opening 140. The funneling feature 158 is formed with a pair of opposing right triangles 160, 162 whose bases meet the second side wall 126. This arrangement provides additional structural rigidity to the fourth ramped wall 156 while contributing to the funneling of seed toward the seed opening 140.

A vacant space is present below each of the lower surfaces 150b, 152b, 154b, 156b of the ramped walls 150-156 and their respective vertical walls, i.e., forward wall 120, rearward wall 122, first side wall 124 and second side wall 126. The forward wall 120 and the second side wall 126 are positioned farthest from the seed opening 140, respectively, resulting in the largest vacant spaces between the lower surface 150b of the first ramped wall 150 and the forward wall 120 and between the lower surface 156b of the fourth ramped wall 156 and the second side wall 126, respectively.

Figure 13:
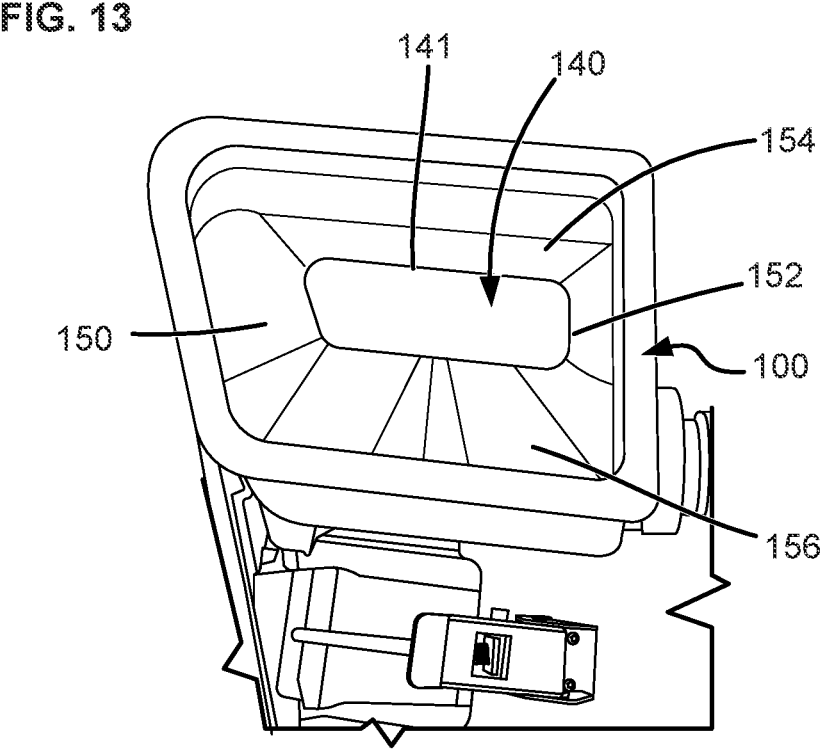
FIG. 13 is a top perspective view of the hopper extension of FIG. 1 secured to the existing hopper of FIG. 1.

When the hopper extension 100 is secured to the hopper 10, as shown in FIG. 13, the seed opening 140 mates with or is proximate to an upper opening to a container area 30, to ensure seed is fed into the container area. Concurrently, the vacant space beneath lower surface 150b of the first ramped wall 150 of the hopper extension 100 is placed over the air channel 36 of the hopper 10 and the vacant space beneath the lower surface 156b of the fourth ramped wall 156 of the hopper extension 100 is placed over the air grate 38 enabling air to circulate from the container area 30, through the air grate 38, and through the vacant spaces beneath the lower surfaces 150b, 156b of the ramped walls 150, 156 to allow airflow to exit the hopper via air channel 36, as it would if the hopper extension 100 were not present and only a lid covered the hopper extension 100. As such, the use of the hopper extension 100 does not interfere with the operation of the blower/vacuum seed delivery of the planter 11. The ramped walls 150-156 additionally provide structural rigidity beyond that provided by the vertical forward, rearward and side walls 120-126.

Figure 10:
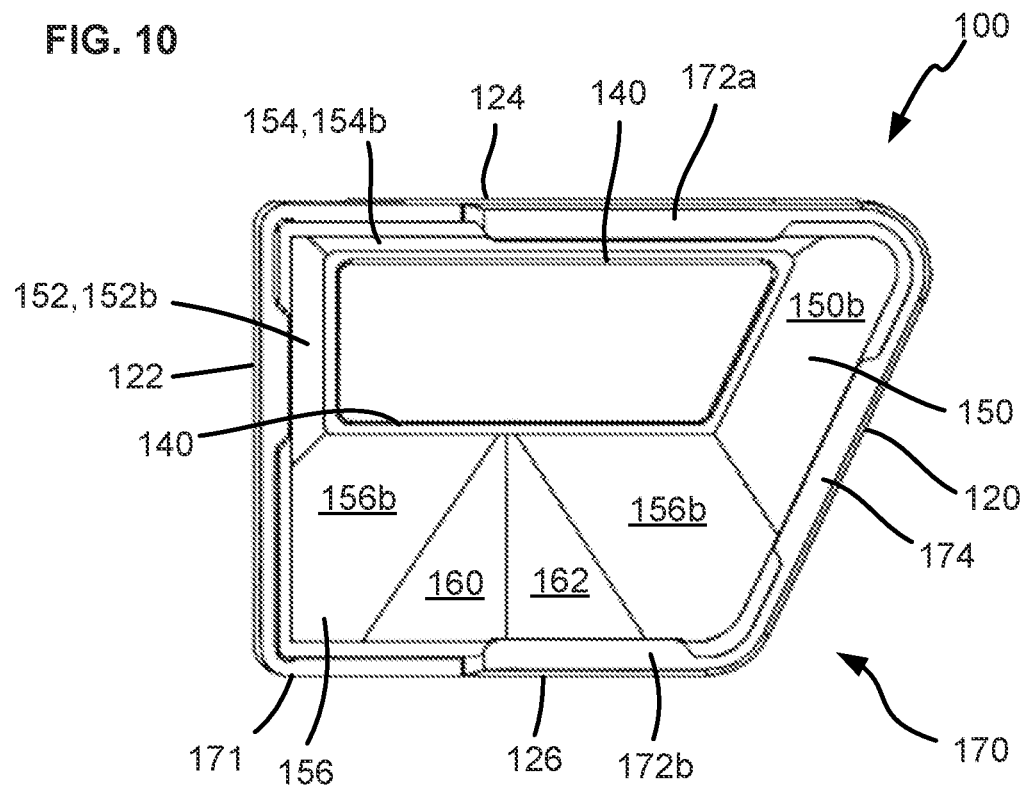
FIG. 10 is a bottom elevation view of the hopper extension of FIG. 1.
Figure 11:
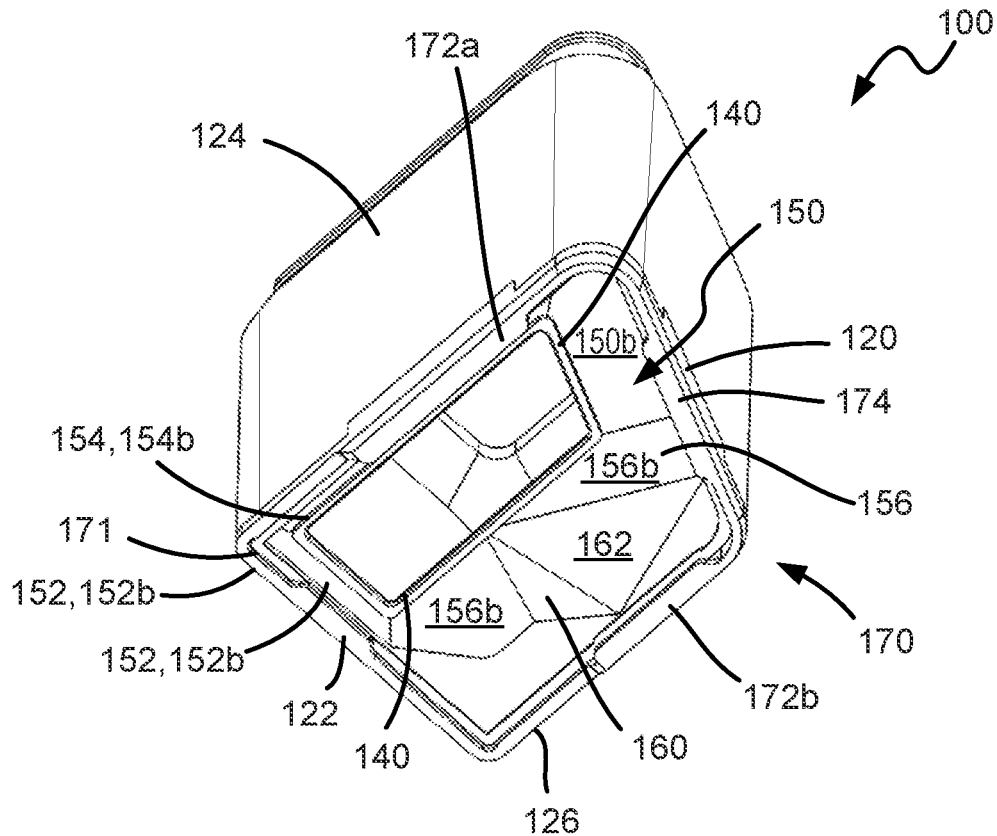
FIG. 11 is a bottom perspective view of the hopper extension of FIG. 1.
Figure 12:
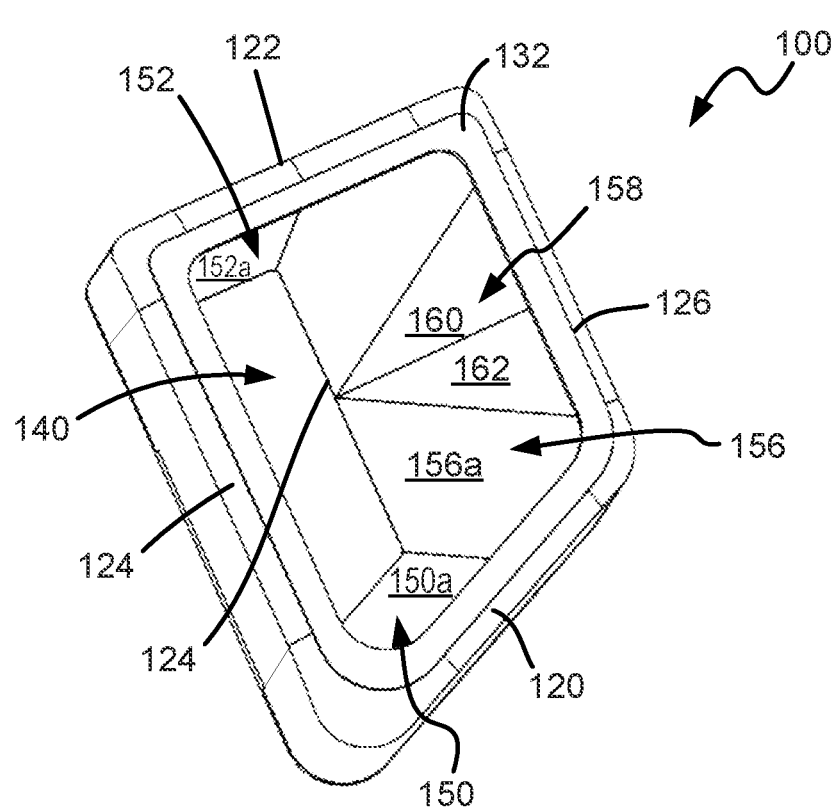
FIG. 12 is a top perspective view of the hopper extension of FIG. 1.
Figure 14:
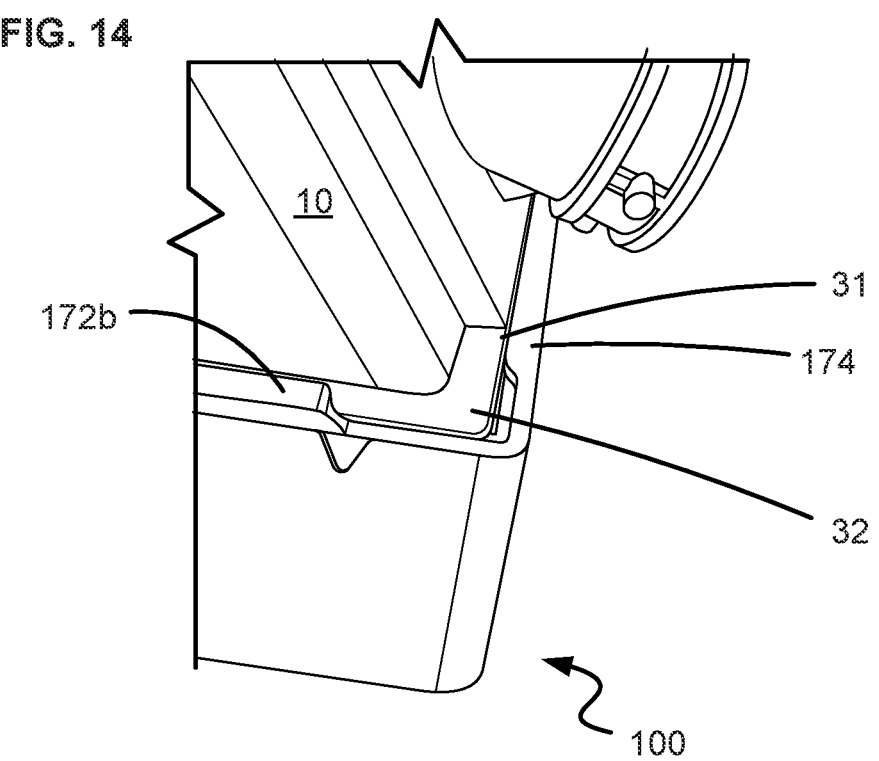
FIG. 14 is a partial bottom perspective view of the hopper extension of FIG. 1 secured to the existing hopper of FIG. 1

Referring to FIGS. 10 and 11, a lower mating interface 170 that is positioned about a perimeter 171 of a lower opening of the hopper extension 100 can be appreciated. The mating interface 170 includes a pair of rails 172a, 172b at a lower edge of first and second side walls, 124, 126 defining corresponding slots that receive the flange 32 of the hopper 10. The mating interface 170 additionally includes a mounting tab 174 to interface with a forward edge 31 of the flange 32 of the hopper 10 (see FIG. 14), thereby retaining the hopper extension 100 in place once installed onto the hopper 10.

Figure 15A:
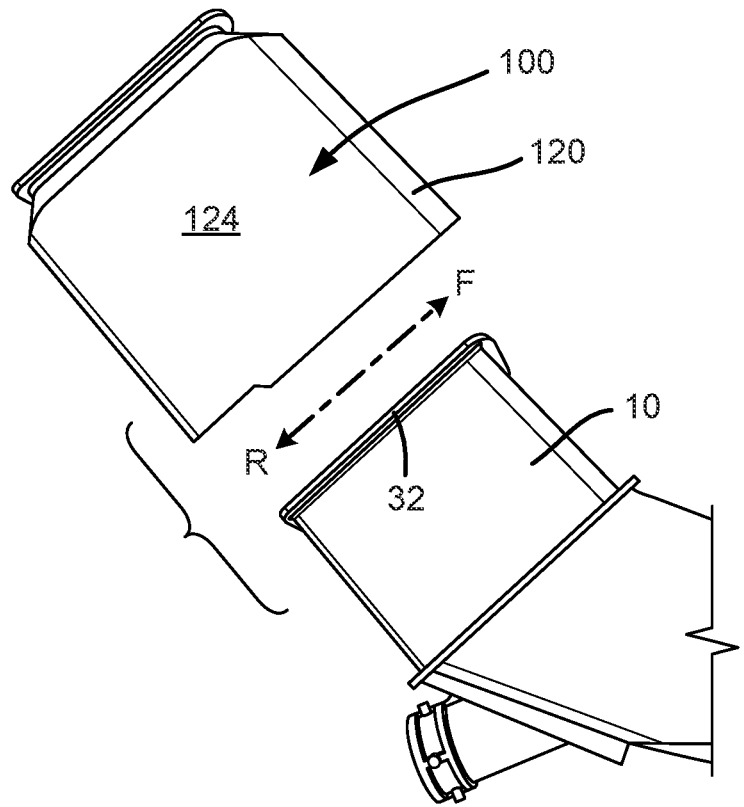
FIGS. 15A-15B are an exploded view and assembled view, respectively of the hopper extension and existing hopper of FIG. 1
Figure 15B:
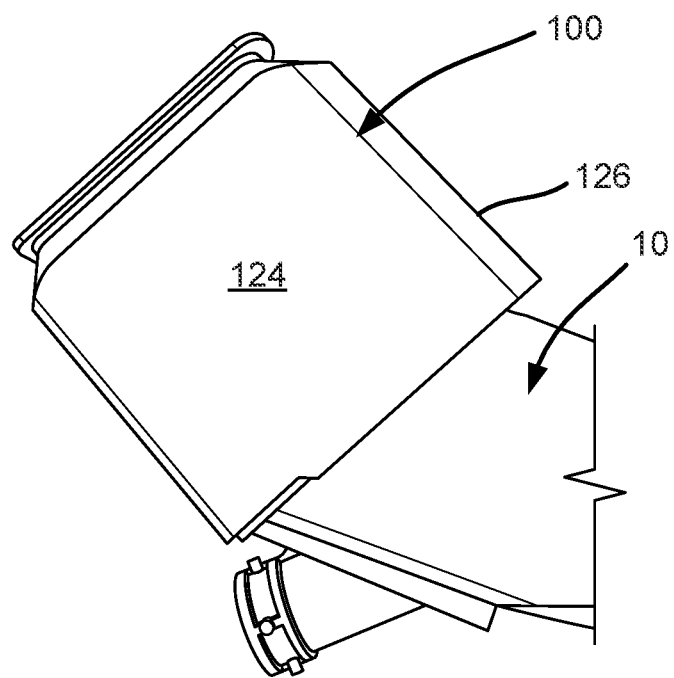
Figure 16:
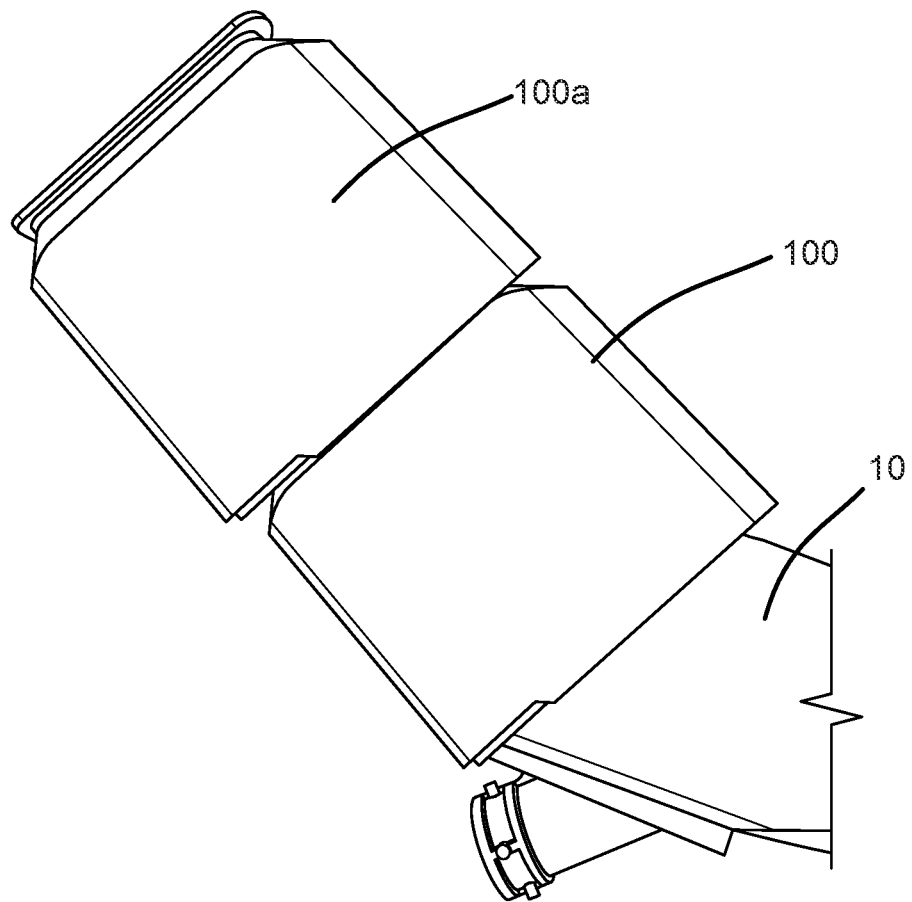
FIG. 16 is an assembled view of the hopper extension of FIG. 1, secured to a second hopper extension and to the existing hopper of FIG. 1.
Figure 17:
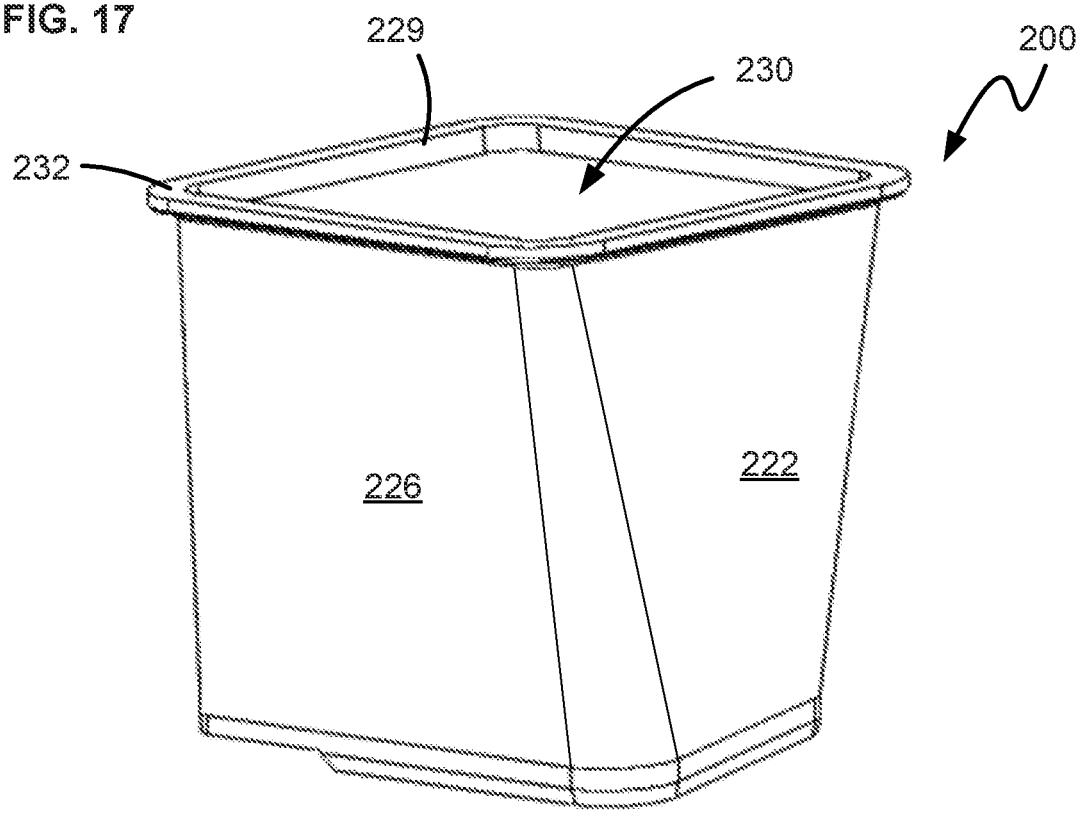
FIG. 17 is a side perspective view of another embodiment of a hopper extension of illustrating a top opening of the hopper extension.
Figure 18:
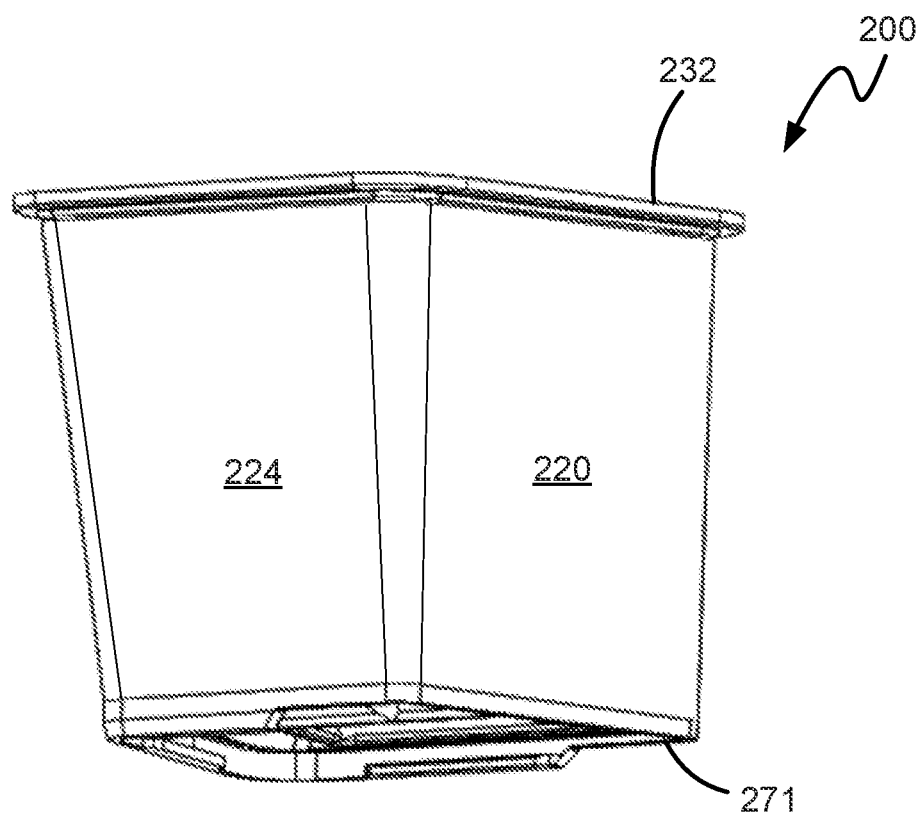
FIG. 18 is a side perspective view of the hopper extension of FIG. 17 illustrating a bottom opening of the hopper extension.
Figure 19:
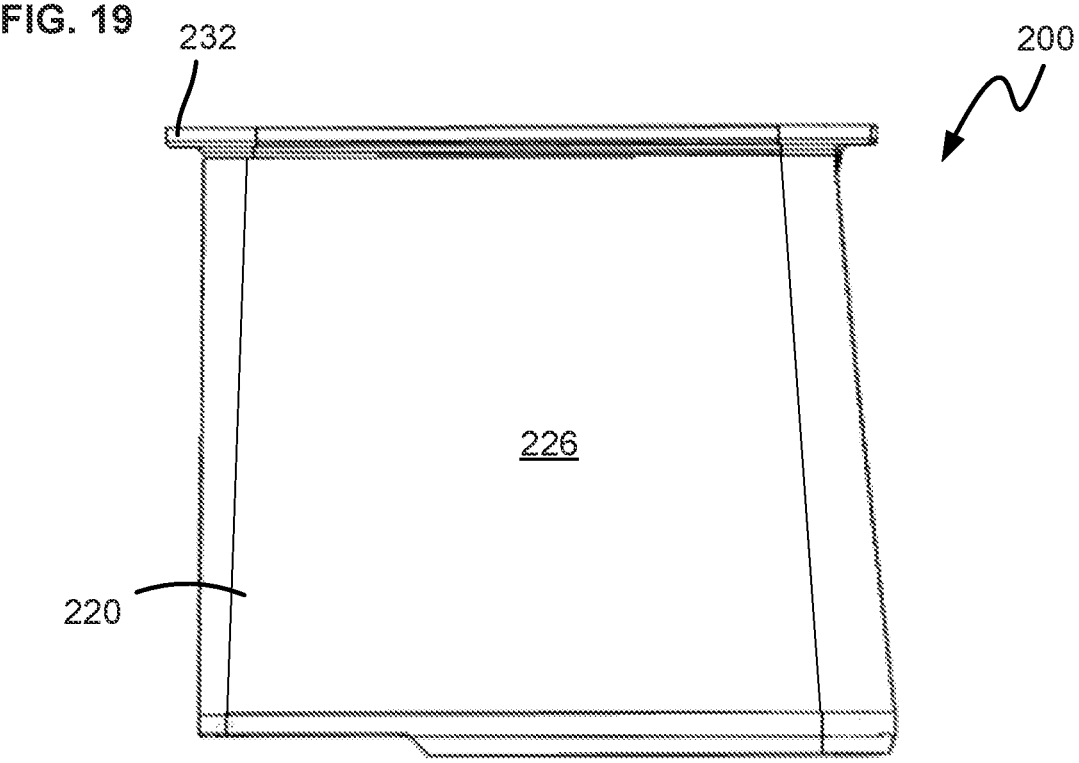
FIG. 19 is a first side elevation view of the hopper extension of FIG. 17.
Figure 20:
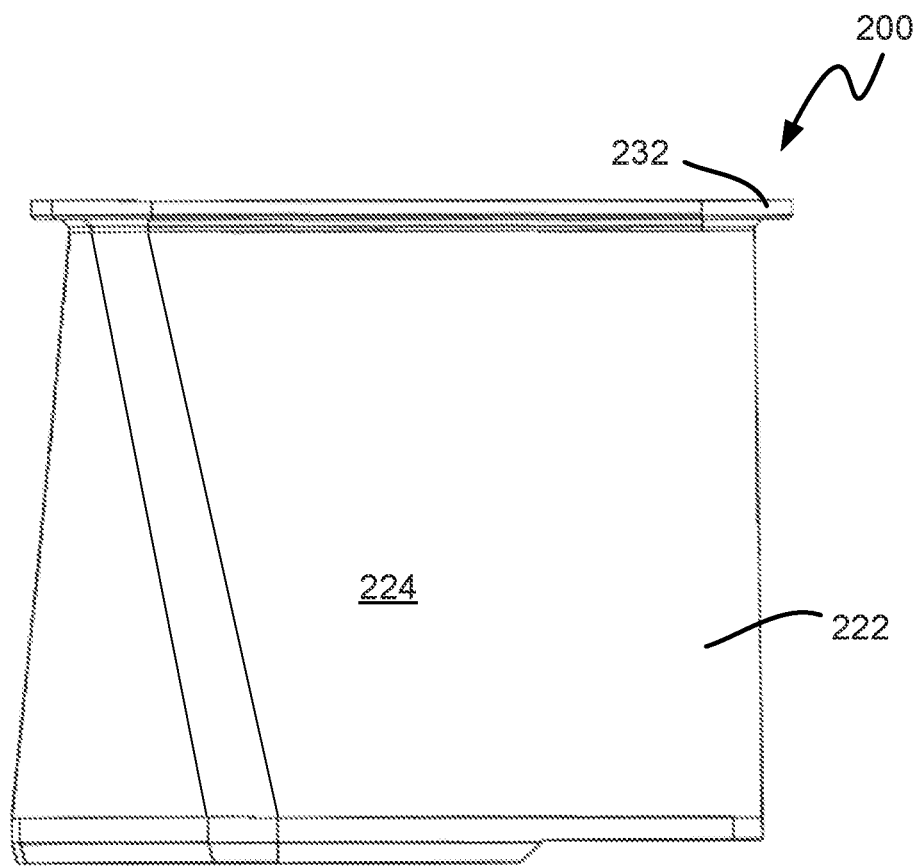
FIG. 20 is a second side elevation view of the hopper extension of FIG. 17.
Figure 21:
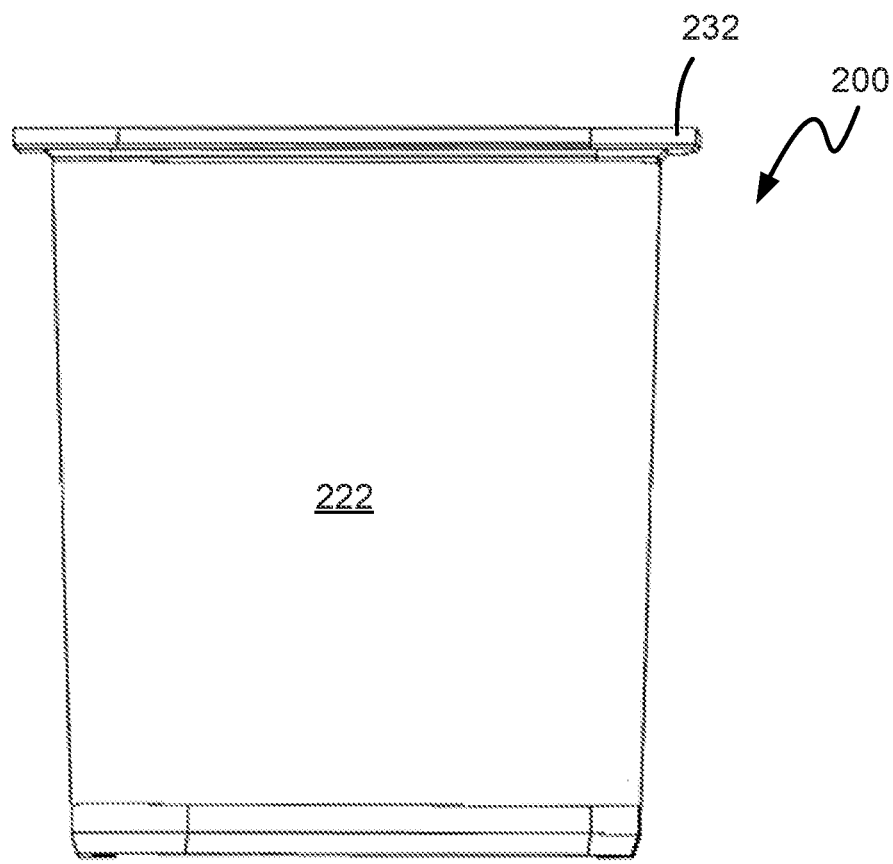
FIG. 21 is a third side elevation view of the hopper extension of FIG. 17.
Figure 22:
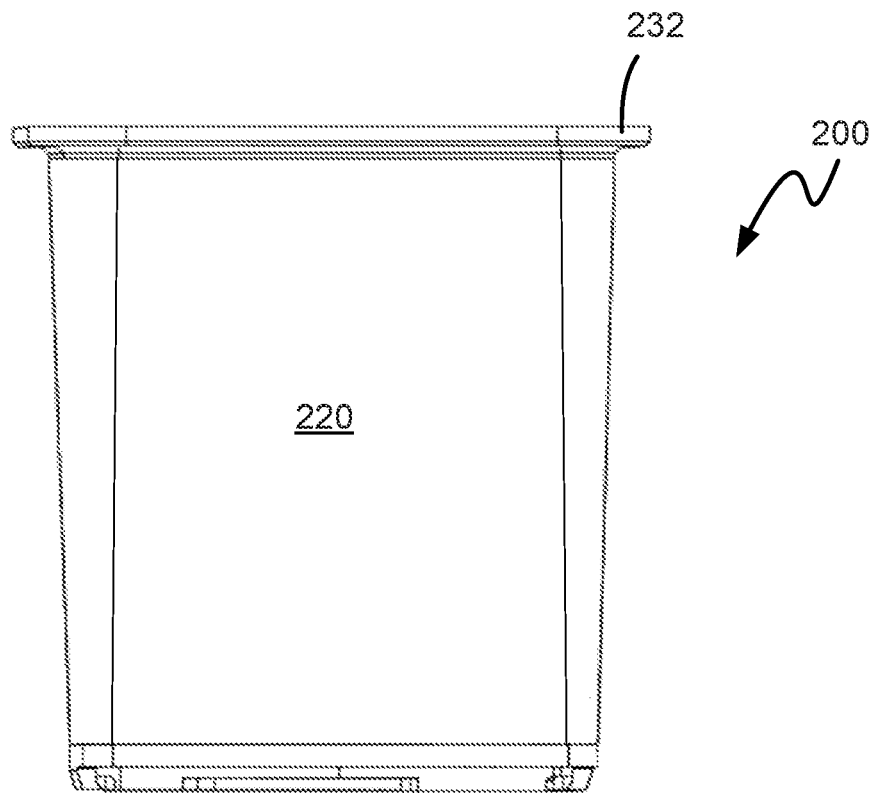
FIG. 22 is a fourth side elevation view of the hopper extension of FIG. 17.
Figure 23:
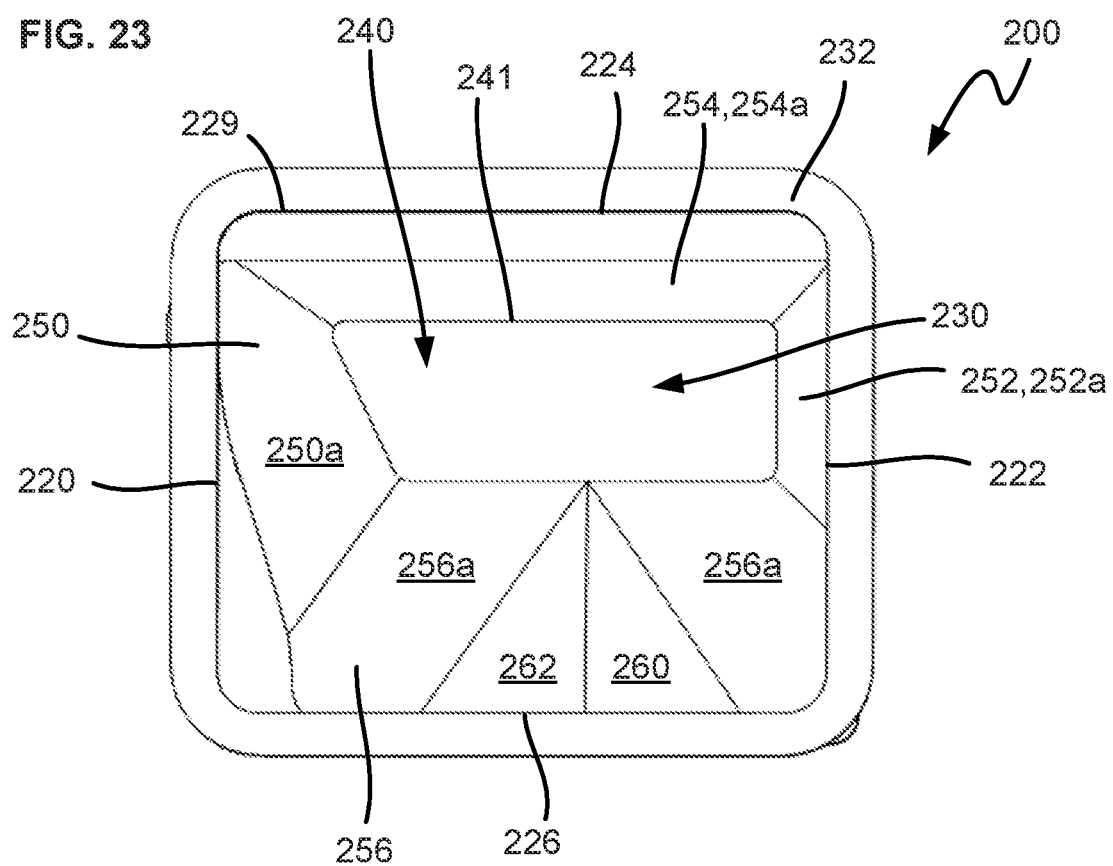
FIG. 23 is a top elevation view of the hopper extension of FIG. 17.

Referring to FIGS. 15A-15B, an exploded view and an assembled view of the hopper extension 100 and the existing hopper 10 is illustrated. As shown, the hopper extension 100 is secured to the existing hopper 10 by sliding the rails 172a, 172b (see FIG. 11) of the hopper extension 100 over the flange 32 of the hopper 10. The hopper extension 100 is slid rearward (R) to secure the hopper extension to the hopper 10 and forward (F) to remove the hopper extension 100 from the hopper 10. After filling the hopper extension 100, the lid 16 (see FIG. 1) of the hopper 10 can be secured to the flange 132 of the hopper extension 100. Alternatively, referring to FIG. 16, a second hopper extension 100a can be stacked atop the first hopper extension 100; further stacking of additional hopper extensions 100 is also possible. In certain embodiments, the flange 132 of the hopper extension 100 is configured similarly to the flange 32 of the hopper 10 enabling the lower mating interface 170 of the hopper extension 100a to interface with flange 132 of the first hopper extension 100. Each hopper extension 100 provides approximately 105 cubic inches of volume in addition to that provided by the existing hopper 10; in alternative embodiments, hopper extensions of different sizes (e.g., heights) could be used as well to adjust overall hopper volume.

The hopper extension 100 is preferably manufactured via additive manufacturing (e.g., three-dimensional printing) using plastics, polymers, epoxy resins or other suitable materials (or combination of materials). While other manners of manufacture are possible, molding of the hopper extension 100 is difficult due to the number of unique and varying surfaces, e.g. ramped walls 150-156, funneling feature 158, flange 132, etc.

FIGS. 17-26 illustrate another embodiment of a hopper extension 200. The hopper extension 200 includes a container area defined by four walls in a square or rectangular configuration and a mating interface having a trapezoidal configuration that corresponds to the configuration of the flange 32 of the existing hopper 10 (see FIG. 2).

More specifically, as shown, the hopper extension 200 includes a forward wall 220 and a rearward wall 222 joined by a first side wall 224 and a second side wall 226. The walls 220-226 define a square or rectangular perimeter 229 of an upper opening to a container area 230. A flange 232 surrounds the perimeter 229 to receive a lid or another type of hopper extension capable of interfacing with the flange 232.

FIGS. 23-26 best illustrate the unique configuration of the container area 230 and hopper mating interface 270. The container area 230 is equipped with a plurality of ramped walls that extend from each the side walls 220-226 to define a seed opening 240 having a perimeter 241 that corresponds to the perimeter of the seed opening 40 in the hopper 10 (see FIG. 2). The ramped walls include a first ramped wall 250, having an upper surface 250a and a lower surface 250b, that extends from the forward wall 220 to the seed opening 240. Relative to the flange 232, the first ramped wall 250 begins at approximately three-quarters down length of the forward wall 220 from the flange 232. The first ramped wall 250 can be formed at a variety of angles; in the example shown, the first ramped wall 250 will have an angle of approximately 45 degrees from vertical (e.g., forming a 135 degree angle with an interior sidewall located above that ramped wall. The ramped walls include a second ramped wall 252, having an upper surface 252a and a lower surface 252b, that extends from the rearward wall 222 to the seed opening 240. Relative to the flange 232, the second ramped wall 252 also begins at approximately three-quarters down the length of the rearward wall 222 from the flange 232. As with the first ramped wall 250, the second ramped wall 252 may be formed at a variety of angles; in the example shown, a 45 degree angle relative to vertical is used. The ramped walls include a third ramped wall 254, having an upper surface 254a and a lower surface 254b, that extends from the first side wall 224 to the seed opening. Relative to the flange 232, the third ramped wall 254 also begins at approximately three-quarters of the way down the length of the first side wall 224 from the flange 232. A similar angle may be used for the third ramped wall 254 (e.g., 45 degrees).

The ramped walls include a fourth ramped wall 256, having an upper surface 256a and a lower surface 256b, that extends from the second side wall 226. Relative to the flange 243, the fourth ramped wall 256 begins at approximately half-way down the length of the second side wall 226 from the flange 232. The fourth ramped wall 256 includes a funneling feature 258 to funnel seed to the seed opening 240. The funneling feature 258 is formed with a pair of opposing right triangles 260, 262 whose bases meet the second side wall 226.

A vacant space is present below each of the lower surfaces 250b, 252b, 254b, 256b of the ramped walls 250-256 and their respective vertical walls, i.e., forward wall 220, rearward wall 222, first side wall 224 and second side wall 226. The forward wall 220 and the second side wall 226 are positioned farthest from the seed opening 240, respectively, resulting in the largest vacant spaces between the lower surface 250b of the first ramped wall 250 and the forward wall 220 and between the lower surface 256b of the fourth ramped wall 256 and the second side wall 226, respectively. When the hopper extension 200 is secured to the hopper 10 the vacant space beneath lower surface 250b of the first ramped wall 250 of the hopper extension 200 is placed over the air channel 36 of the hopper 10 and the vacant space beneath the lower surface 256b of the fourth ramped wall 256 of the hopper extension 200 is placed over the air grate 38 enabling air to circulate as it would if the hopper extension 200 were not present and only a lid covered the hopper extension 200. As such, the use of the hopper extension 200 does not interfere with the operation of the blower/vacuum seed delivery of the planter 11. The ramped walls 250-256 additionally provide structural rigidity beyond that provided by the vertical forward, rearward and side walls 220-226.

Figure 24:
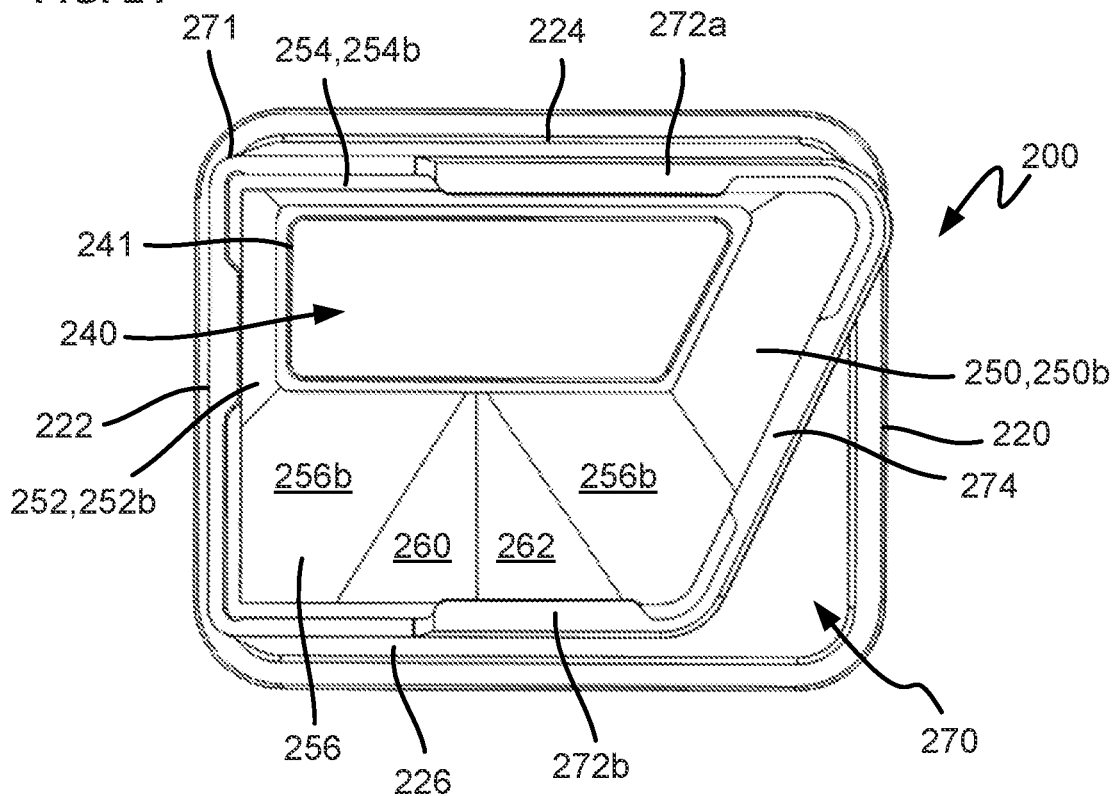
FIG. 24 is a bottom elevation view of the hopper extension of FIG. 17.
Figure 25:
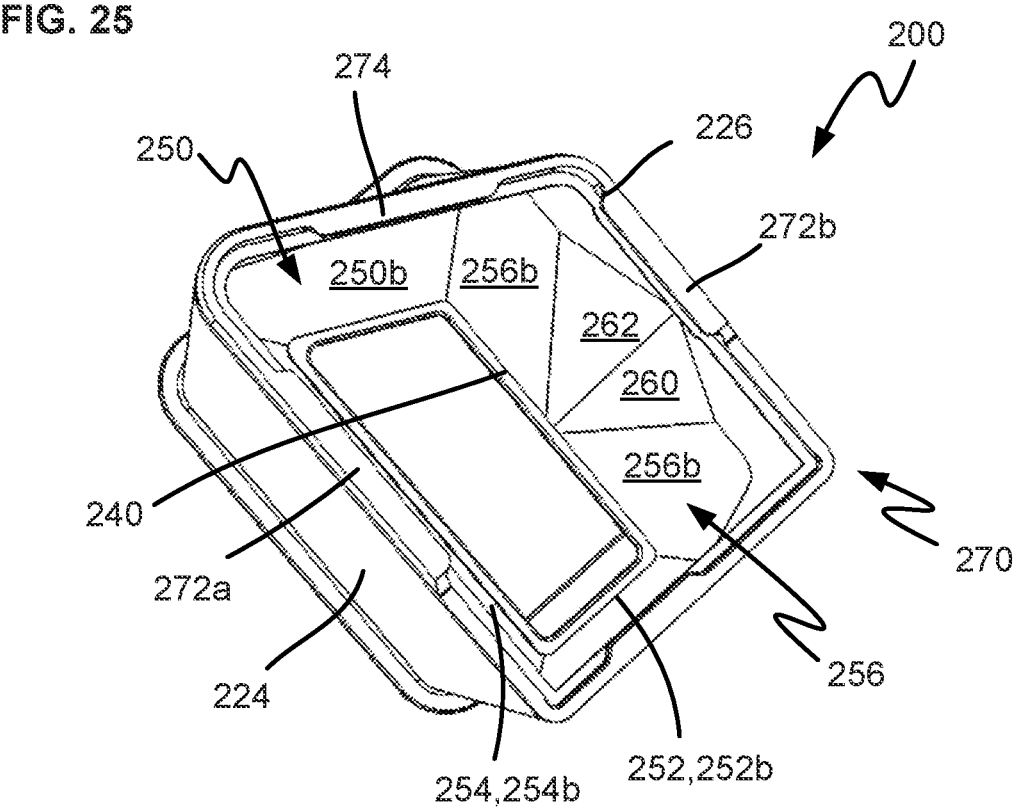
FIG. 25 is a bottom perspective view of the hopper extension of FIG. 17.
Figure 26:
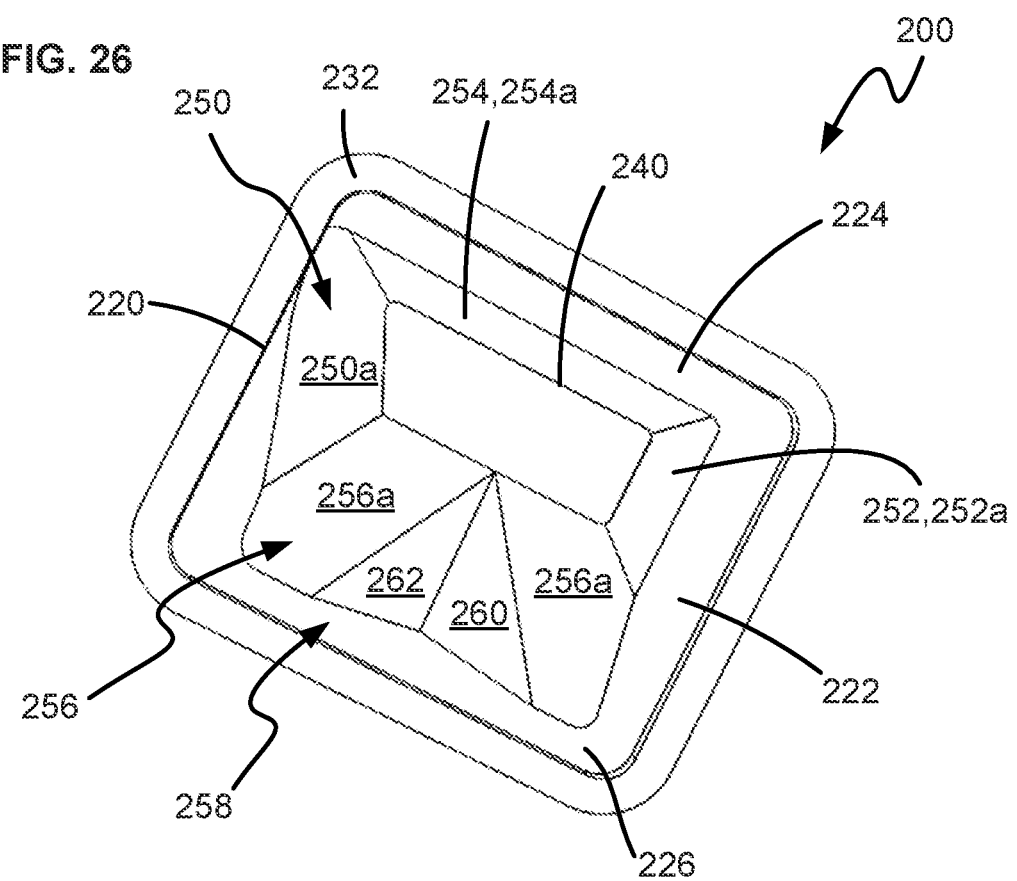
FIG. 26 is a top perspective view of the hopper extension of FIG. 17.

FIGS. 24 and 25 best illustrate a lower mating interface 270 about a perimeter 271 of a lower opening of the hopper extension 200. The mating interface 270 includes a pair of rails 272a, 272b at a lower edge of first and second side walls, 224, 226 defining corresponding slots that receive the flange 32 of the hopper 10. The mating interface 270 additionally includes a mounting tab 274 to interface with a forward edge 31 of the flange 32 of the hopper 10.

As with the hopper extension 100, the hopper extension 200 is secured to the existing hopper 10 by sliding the rails 272a, 272b of the hopper extension 100 over the flange 32 of the hopper 10. The hopper extension 200 is slid in a first direction to secure the hopper extension 200 to the hopper 10 and in a second direction, opposite the first direction, to remove the hopper extension 200 from the hopper 10. After filling the hopper extension 200, a lid suited to interface with the flange 232 of the hopper extension 200 can be used to cover the hopper extension 200. Due to the mating interface 270 of the hopper extension 200 being of a different shape/configuration than the flange 232 of the hopper extension 200, it is not possible to stack a second hopper extensions 200 atop a first hopper extension 200. However, another type of hopper extension may be able to interface with the flange 232. As with hopper extension 100, hopper extension 200 may be sized to provide an addition 105 cubic inches of capacity, but may be of a varied height to accommodate other desired capacities.

As with the hopper extension 100, the hopper extension 200, is preferably of a unitary configuration manufactured via additive manufacturing (e.g., three-dimensional printing) using plastics, polymers, epoxy resins or other suitable materials (or combination of materials). While other manners of manufacture are possible, molding of the hopper extension 200 is difficult due to the number of unique and varying surfaces, e.g. ramped walls 250-256, funneling feature 258, flange 232, etc.

Figure 27:
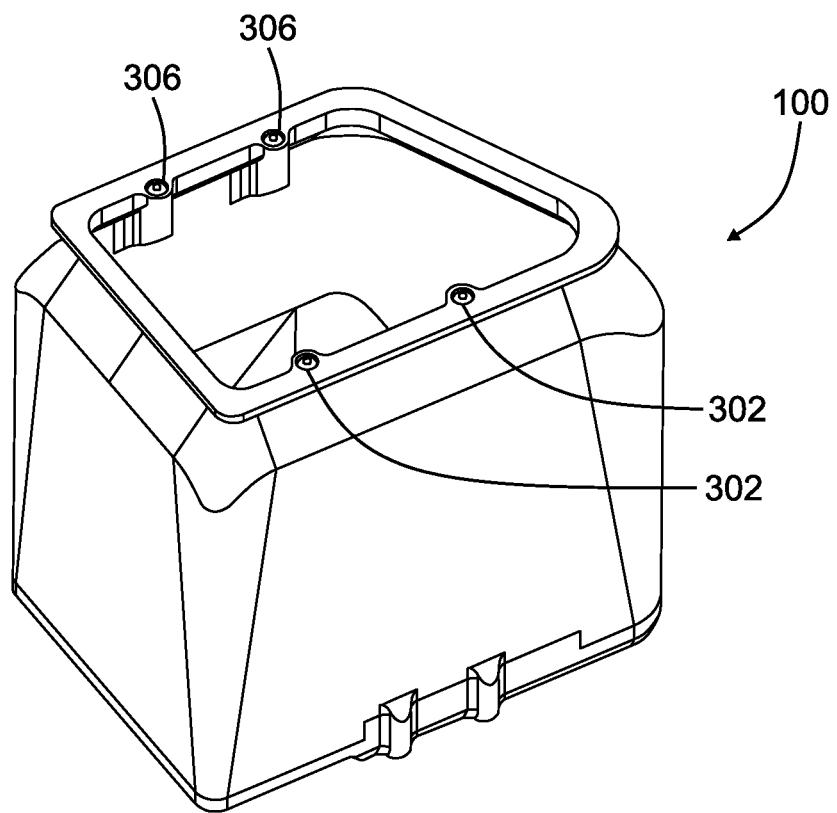
FIG. 27 is a top perspective view of a hopper.
Figure 28:
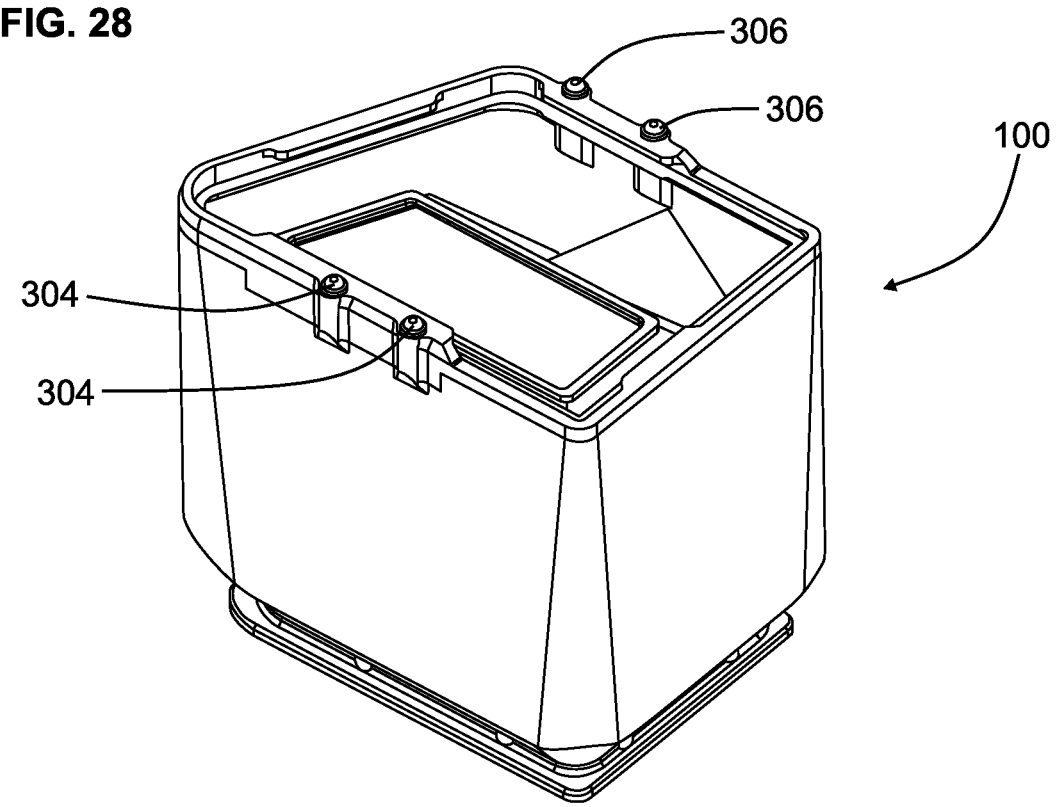
FIG. 28 is a bottom perspective view of a hopper.

Referring now to FIGS. 27 and 28, top and bottom perspective views of the hopper extension 100 are illustrated. In the illustrated embodiment, the hopper extension 100 is configured to include a plurality of upper holes 302 and/or lower holes 304 to receive corresponding screws 306. The holes 302, 304 and screws 306 are included to provide additionally structural integrity to the hopper, if needed.

It will be appreciated that aspects of the above embodiments may be combined in any way to provide numerous additional embodiments. These embodiments will not be described individually for the sake of brevity.

While the present invention has been described above primarily with reference to the accompanying drawings, it will be appreciated that the invention is not limited to the illustrated embodiments; rather, these embodiments are intended to disclose the invention to those skilled in this art. Note that features of one or more embodiments can be incorporated in other embodiments without departing from the spirit of the invention. In the drawings, like numbers refer to like elements throughout. Thicknesses and dimensions of some components may be exaggerated for clarity.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of the present invention.

Spatially relative terms, such as "under", "below", "lower", "over", "upper", "top", "bottom" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "under" or "beneath" other elements or features would then be oriented "over" the other elements or features. Thus, the exemplary term "under" can encompass both an orientation of over and under. The device may be otherwise oriented (rotated 90 degrees or at other orientations) and the spatially relative descriptors used herein interpreted accordingly.

Well-known functions or constructions may not be described in detail for brevity and/or clarity. As used herein the expression "and/or" includes any and all combinations of one or more of the associated listed items.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises", "comprising", "includes" and/or "including" when used in this specification, specify the presence of stated features, operations, elements, and/or components, but do not preclude the presence or addition of one or more other features, operations, elements, components, and/or groups thereof.

Although exemplary embodiments of this invention have been described, those skilled in the art will readily appreciate that many modifications are possible in the exemplary embodiments without materially departing from the novel teachings and advantages of this invention. Accordingly, all such modifications are intended to be included within the scope of this invention as defined in the claims. The invention is defined by the following claims, with equivalents of the claims to be included therein.

What is claimed:

1. A hopper extension, comprising:
   forward and rearward walls connected by first and second side walls to form a container area having an upper opening and a lower opening, the lower opening including a mating interface that slidably interfaces with an existing hopper; and
   a ramped wall extending from each of the forward, rearward, first side and second side walls to form a seed opening positioned intermediate the upper and lower openings, an underside of at least one of the ramped walls defining an air cavity.

2. The hopper extension of claim 1, wherein the upper and lower opening are defined by a perimeter corresponding to a perimeter of an upper opening of the existing hopper.

3. The hopper extension of claim 2, wherein the perimeter comprises a trapezoidal perimeter.

4. The hopper extension of claim 1, wherein the upper opening is defined by a first perimeter and the lower opening is defined by a second perimeter that is different from the first perimeter, the second perimeter corresponding to a perimeter of an upper opening of the existing hopper.

5. The hopper extension of claim 4, wherein the first perimeter comprises a square or rectangular perimeter and wherein the second perimeter comprises a trapezoidal perimeter.

6. The hopper extension of claim 1, wherein the mating interface includes a pair of rails that interface with a flange surrounding an upper opening of the existing hopper.

7. The hopper extension of claim 6, wherein mating interface additionally includes a mounting tab that interfaces with a forward edge of the flange of the existing hopper.

8. The hopper extension of claim 1, wherein the air cavity of the hopper extension is positioned over an air grate of the existing hopper when the hopper extension is secured to the existing hopper.

9. The hopper extension of claim 8, wherein the underside of at least two of the ramped walls define first and second air cavities, and wherein the first air cavity of the hopper extension is positioned over an air grate of the existing hopper and the second air cavity of the hopper extension is positioned over an air channel of the existing hopper when the hopper extension is secured to the existing hopper.

10. The hopper extension of claim 1, wherein at least one of the ramped walls includes a funneling feature that funnels towards the seed opening.

11. The hopper extension of claim 1, wherein the upper opening of the hopper extension includes a flange in a configuration corresponding to a flange of an upper opening of the existing hopper, wherein the flange in the configuration corresponding to the flange of the upper opening of the existing hopper accepts an existing lid of the existing hopper.

12. The hopper extension of claim 1, wherein the upper opening of the hopper extension includes a flange in a configuration corresponding to a flange of an upper opening of the existing hopper, wherein the flange in the configuration corresponding to the flange of the upper opening of the existing hopper accepts another hopper extension establishing a stacked configuration of hopper extensions.

13. The hopper extension of claim 1, wherein the hopper extension comprises an additive-manufactured hopper extension.

14. A hopper extension, comprising:
    an additive-manufactured unitary unit that includes:
    a container defined by an upper opening and a lower opening, the lower opening including a mating interface that slidably interfaces with an existing hopper; and
    a plurality of ramped walls interior to the container and angling downward toward the lower opening, the plurality of ramped walls meeting to define a seed opening intermediate the upper and lower opening with an air cavity existing between an underside of the ramped walls and the lower opening.

15. The hopper extension of claim 14, wherein the seed opening of the hopper extension is aligned with a seed opening of the existing hopper when the hopper extension is secured to the existing hopper via the mating interface.

16. The hopper extension of claim 15, wherein the air cavity of the hopper extension is positioned over an air grate of the existing hopper when the hopper extension is secured to the existing hopper via the mating interface.

17. The hopper extension of claim 14, wherein the upper opening and the lower opening of the hopper extension are each defined by a perimeter corresponding to a perimeter to an upper opening of the existing hopper.

18. The hopper extension of claim 14, wherein the upper opening is defined by a first perimeter and the lower opening is defined by a second perimeter that is different from the first perimeter.

19. The hopper extension of claim 18, wherein only the second perimeter of the lower opening corresponds to a perimeter of an upper opening of the existing hopper.

20. A hopper extension system, comprising:
first and second hopper extensions stacked upon one another, wherein each of the first and second hopper extensions includes:
  a container defined by an upper opening and a lower opening, the lower opening including a mating interface; and
  a plurality of ramped walls interior to the container and angling downward toward the lower opening, the plurality of ramped walls meeting to define a seed opening intermediate the upper and lower opening with an air cavity existing between an underside of the ramped walls and the lower opening,
  wherein the mating interface slidably interfaces with a flange surrounding the upper opening of the other of the first and second hopper extensions or with a flange surrounding an upper opening of an existing hopper.

\* \* \* \* \*